(12) United States Patent
Meichtry

(10) Patent No.: US 11,254,526 B1
(45) Date of Patent: Feb. 22, 2022

(54) VEHICLE RESTRAINING HOOK SYSTEM

(71) Applicant: MULTI-FAB PRODUCTS, LLC, Menomonee, WI (US)

(72) Inventor: Michael Meichtry, Brookfield, WI (US)

(73) Assignee: Multi-Fab Products, LLC, Menomonee, WI (US)

( * ) Notice: Subject to any disclaimer, the term of this patent is extended or adjusted under 35 U.S.C. 154(b) by 0 days.

(21) Appl. No.: 17/146,078

(22) Filed: Jan. 11, 2021

(51) Int. Cl.
*B65G 69/00* (2006.01)
*B60D 1/24* (2006.01)
*B60D 1/04* (2006.01)
*B60D 1/00* (2006.01)

(52) U.S. Cl.
CPC ............ *B65G 69/003* (2013.01); *B60D 1/04* (2013.01); *B60D 1/242* (2013.01); *B60D 2001/001* (2013.01)

(58) Field of Classification Search
CPC ................................. B65G 69/003; B60D 1/04
See application file for complete search history.

(56) References Cited

U.S. PATENT DOCUMENTS

| | | | | |
|---|---|---|---|---|
| 4,400,127 A | * | 8/1983 | Metz .................... | B65G 69/003 14/71.1 |
| 4,555,211 A | * | 11/1985 | Metz .................... | B65G 69/003 14/71.1 |
| 6,371,714 B1 | | 4/2002 | Sherard et al. | |
| 7,056,077 B2 | * | 6/2006 | Pedersen .............. | B65G 69/003 414/401 |
| 10,689,213 B2 | * | 6/2020 | Mushynski .......... | B65G 69/003 |
| 10,906,759 B2 | * | 2/2021 | Schlintz ............... | B65G 69/003 |
| 2004/0042882 A1 | * | 3/2004 | Breen ................... | B65G 69/003 414/401 |
| 2017/0066607 A1 | * | 3/2017 | Muhl .................... | B65G 69/003 |
| 2017/0144847 A1 | * | 5/2017 | Gadbois ............... | B65G 69/003 |
| 2019/0263607 A1 | * | 8/2019 | Mushynski ........... | B65G 67/54 |
| 2020/0331714 A1 | * | 10/2020 | Gadbois ............... | B65G 69/003 |

FOREIGN PATENT DOCUMENTS

WO     2017044235 A1     3/2017

* cited by examiner

*Primary Examiner* — Mark C Hageman
(74) *Attorney, Agent, or Firm* — Erin Ella Block; DeWitt LLP

(57) ABSTRACT

The present invention is a vehicle restraining hook. The hook includes a shank extending between an axle interface and a hook bend. The hook bend comprises an inner hook surface extending between the shank and a hook tip. The inner hook surface comprises at least a primary bend and a secondary bend, and in some cases a tertiary bend. Each of the primary bend and secondary bend comprises two planar surfaces, while the tertiary bend comprises a curved surface. These surfaces interact with a RIG bar to generate a force rotating the hook up and ensuring that it maintains contact with the RIG bar.

13 Claims, 7 Drawing Sheets

VEHICLE RESTRAINING HOOK SYSTEM

BACKGROUND

This invention relates to a hook system, specifically a hook system capable of restraining a vehicle trailer during loading and unloading.

If a vehicle trailer is removed prematurely from a loading dock, the trailer may still contain workers or a fork truck and operator. Worse, the trailer may be removed when the workers or fork truck are transitioning from the loading dock to the trailer. Either action can cause workers or the fork truck and operator to fall from the trailer or impact a trailer wall, resulting in significant injury to persons and damage to property.

To prevent premature removal, a vehicle restraint on the loading dock is moved into an operable position by the trailer backing up to the loading dock and contacting the restraint. Once the trailer is in position, a loading dock attendant engages the restraint which in turn rotates a vehicle restraining hook in the restraint such that the hook engages the rear impact guard bar, or RIG bar, of the trailer. Once engaged, the hook prevents the RIG bar and therefore the trailer from being removed from the loading dock until properly released by the dock attendant.

The hook in these restraints is generally operated via electromechanical means, usually an electric motor coupled to a shaft rotational speed reducer such as a gear-based drivetrain and/or sprockets and chain. Included in the drivetrain is usually a clutch or brake to allow for slip to prevent damage to the drivetrain when the restraining hook is pulled by a RIG bar. The hook still allows for some limited horizontal motion of the RIG bar and trailer in the engaged position. It is not until the RIG bar is moved sufficiently away from the loading dock that the hook captures the RIG bar and prevents further horizontal motion. This horizontal motion can occur fora number of reasons including the momentum transfer of the fork truck stopping and starting in the trailer or entering or exiting the trailer, especially if the brakes of the trailer have not been properly set, or the truck driver driving away prematurely.

When the RIG bar is at its furthest point away from the loading dock and being captured by the hook, the hook has been pulled and rotated by the RIG bar into the most forward and lowest position in which the hook can reliably capture the RIG bar. Lowering the hook any further would put it in a condition that may not reliably capture the RIG bar.

Throughout the loading and or unloading process the trailer is subjected to up and down motion due to the combination of entry and exit of the relatively heavy fork truck into and out of the trailer and the compliance of the trailer suspension that allows this vertical motion. These up and down accelerations cause the restraint to move up and down with the trailer. The hook, which pivots about an axis orthogonal to the vertical motion and is generally made from relatively thick, heavy steel, is also subject to inertial accelerations from the vertical motion of the restraint via the trailer. If the engagement system for the hook is not robust enough to hold against the combination of trailer accelerations and acceleration downward due to gravity, the resulting torque on the hook pivot axis can rotate it towards the disengaged position, even to the point of no longer being safely engaged. In cases where the hook has already been pulled to its lowest reliable capture point and further loading or unloading is required, any further lowering of the hook due to vertical motion can cause an unsafe situation.

There is an unmet need in the art for a hook useable in a vehicle restraining system capable of reducing the likelihood of further rotation in the disengaging direction when a situation occurs that positions the hook at its absolute lowest point of capturing a RIG bar.

BRIEF SUMMARY

The present invention is a vehicle restraining hook device. The hook includes a shank extending between an axle interface and a hook bend. The hook bend comprises an inner hook surface extending between the shank and a hook tip. The inner hook surface comprises a primary bend and a secondary bend. The primary bend comprises two planar surfaces. The secondary bend comprises two planar surfaces. The hook tip comprises a smooth tip, without any teeth, additional hooks, barbs, or protrusions.

The present invention is a vehicle restraining hook device. The hook includes a shank extending between an axle interface and a hook bend. The hook bend comprises an inner hook surface extending between the shank and a hook tip. The inner hook surface comprises a primary bend, a secondary bend, and a tertiary bend. The primary bend comprises two planar surfaces. The secondary bend comprises two planar surfaces. The tertiary bend comprises a curved surface. The hook tip comprises a smooth tip, without any teeth, additional hooks, barbs, or protrusions.

Another embodiment of the present invention is a vehicle restraining hook system. The system includes a vertical member with a track and a carriage with a horizontal carriage RIG riding surface and an elongated aperture. The carriage is slidably engaged with the track of the vertical member. The system also includes one of the above hooks, which is rotatable relative to the carriage about the axle interface in an engaging direction and a disengaging direction. The inner hook surface is configured to make contact with a RIG bar and generate a resultant force normal to the inner hook surface. The resultant force defines a force vector which extends from the point of contact and below the axle interface. The orientation of the resultant force creates a resultant torque about the axle interface in the engaging direction.

It should be understood that for clarity, not every part is labeled in every drawing. Lack of labeling should not be interpreted as a lack of disclosure.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
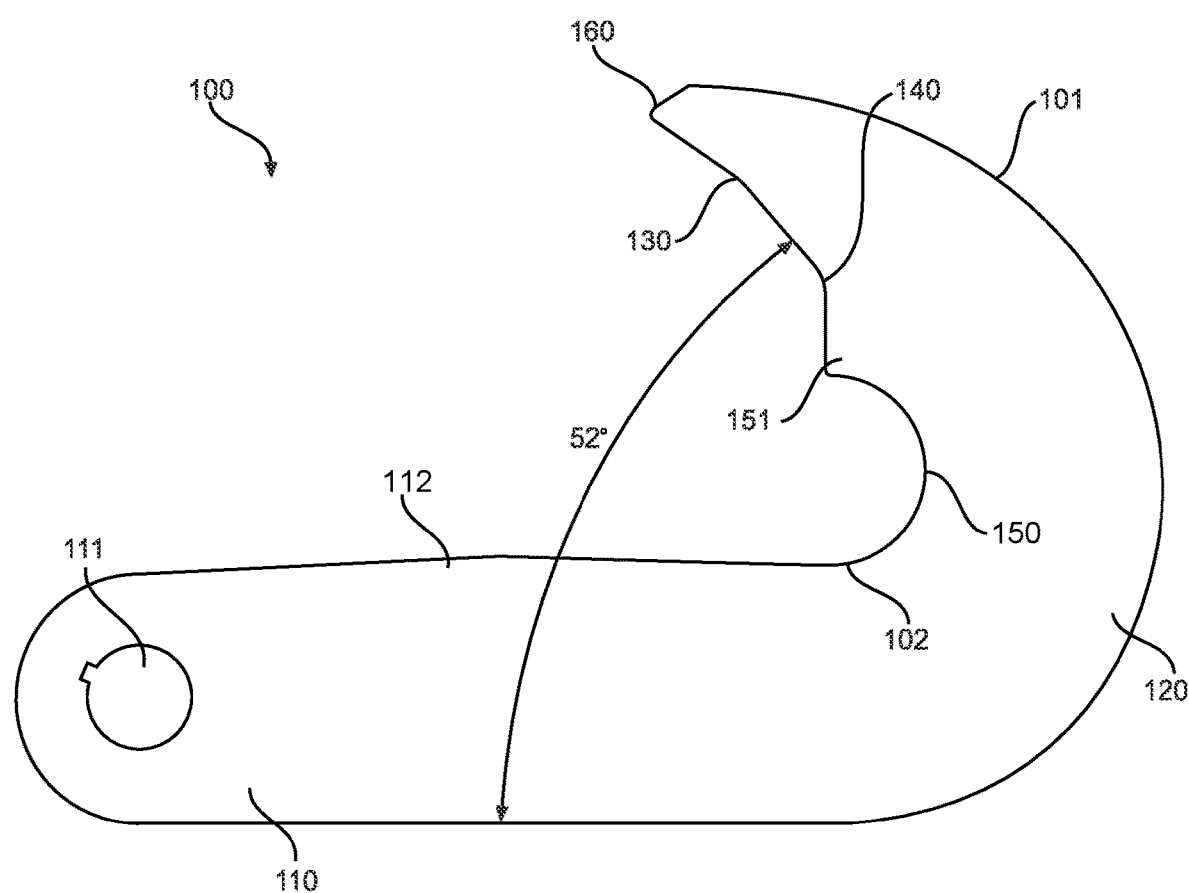
FIG. 1 is a side view of an exemplary embodiment of a hook for use in a vehicle restraining hook system.
Figure 2A:
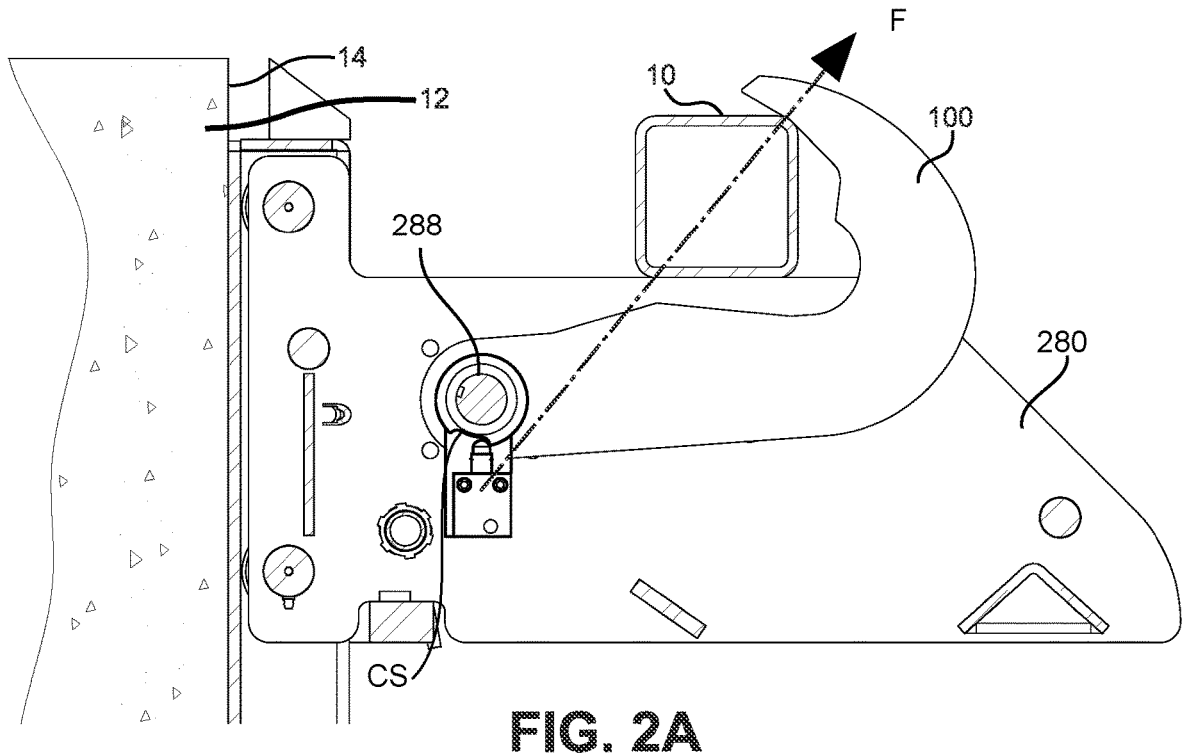
FIGS. 2a, 2b, 2c, 2d, 2e, and 2f are side views of an exemplary embodiment of the vehicle restraining hook system in use with different RIG bars.
Figure 2B:
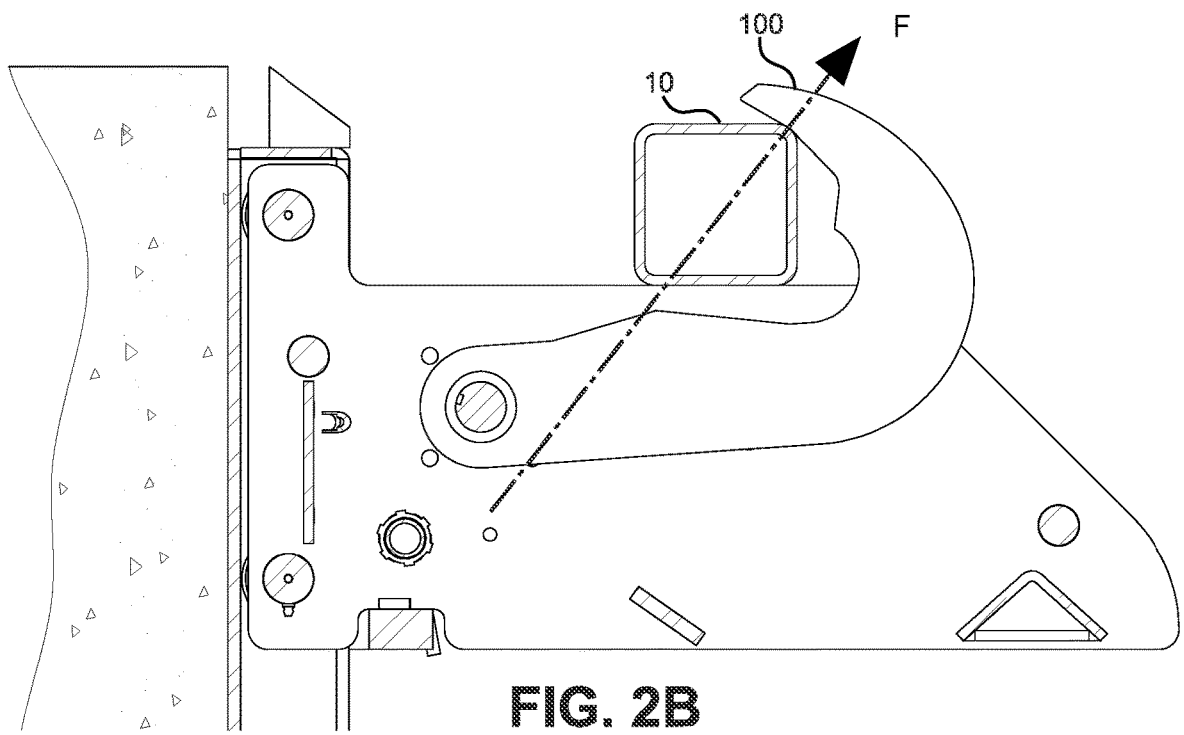
Figure 2C:
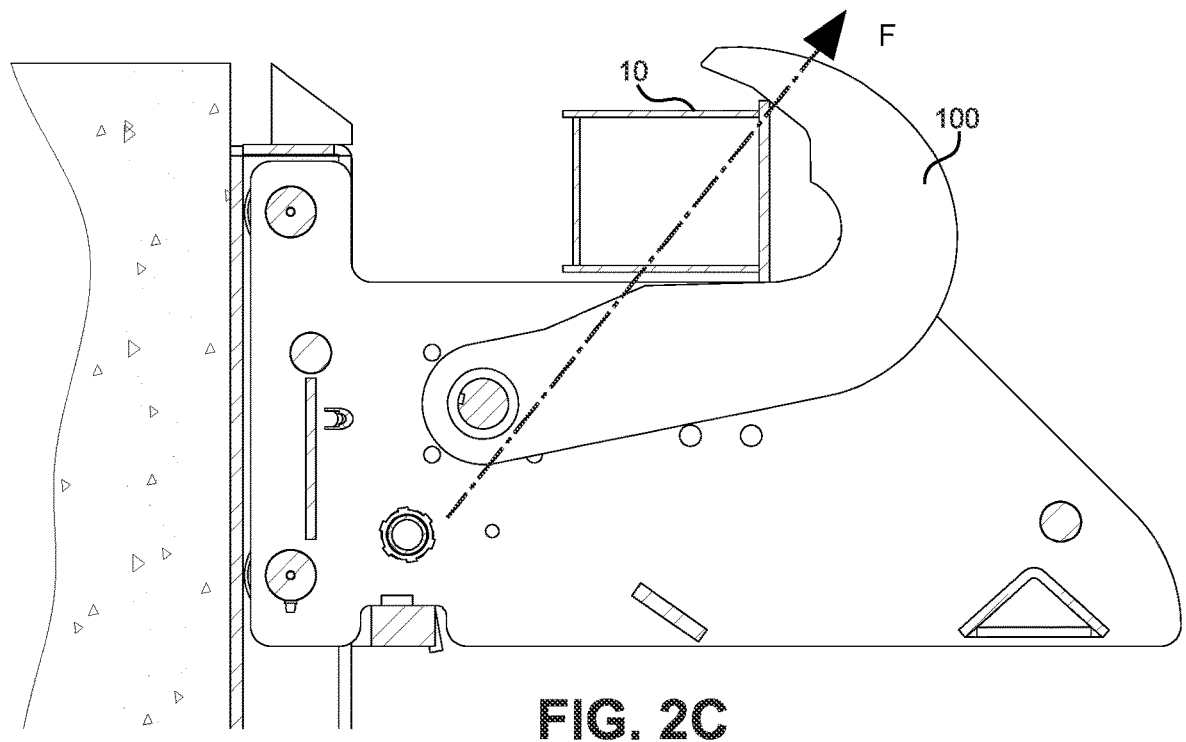
Figure 2D:
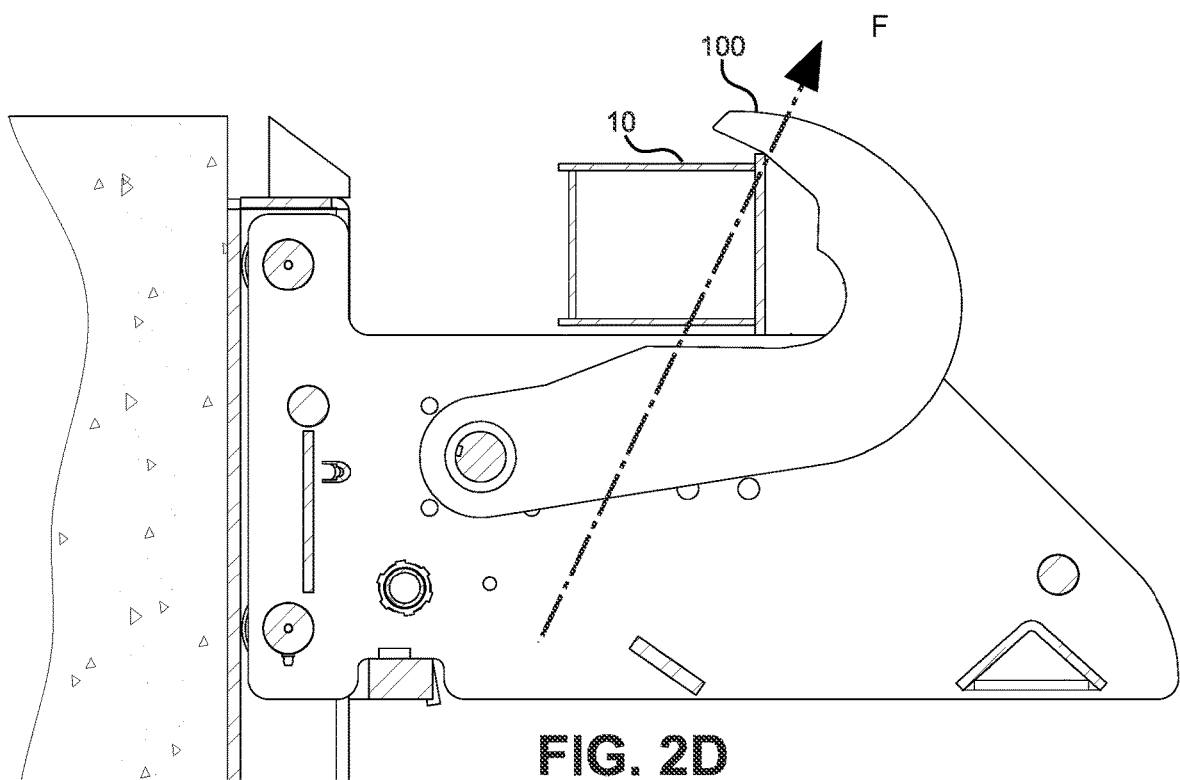
Figure 2E:
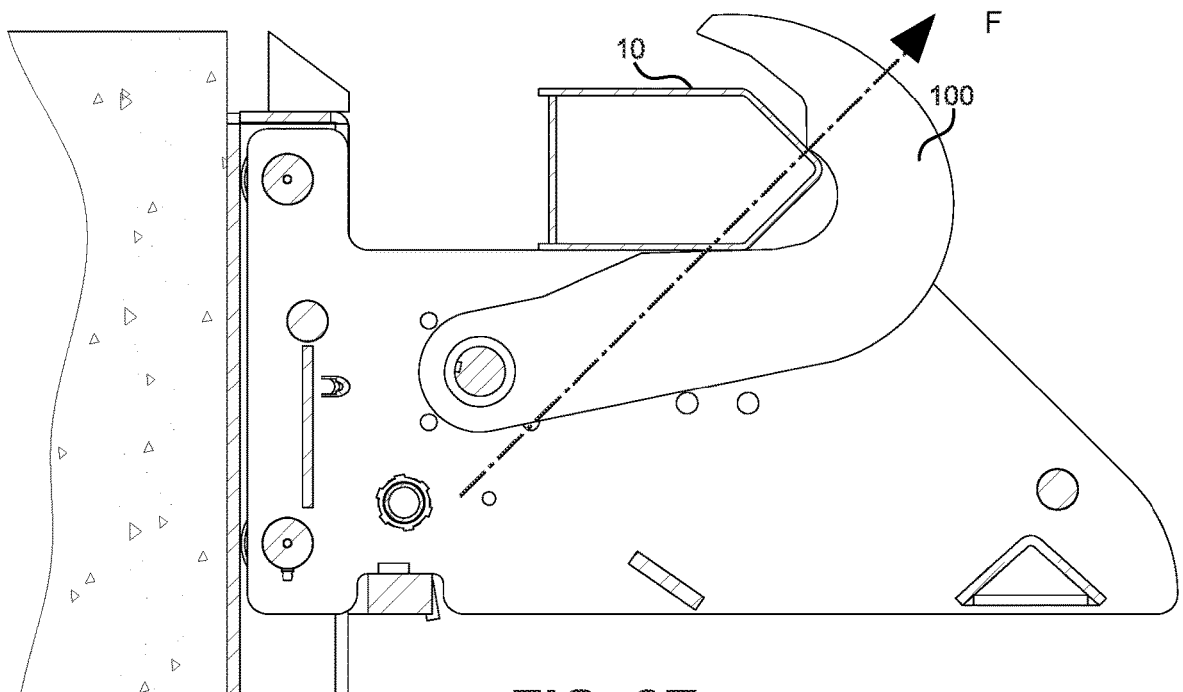
Figure 2F:
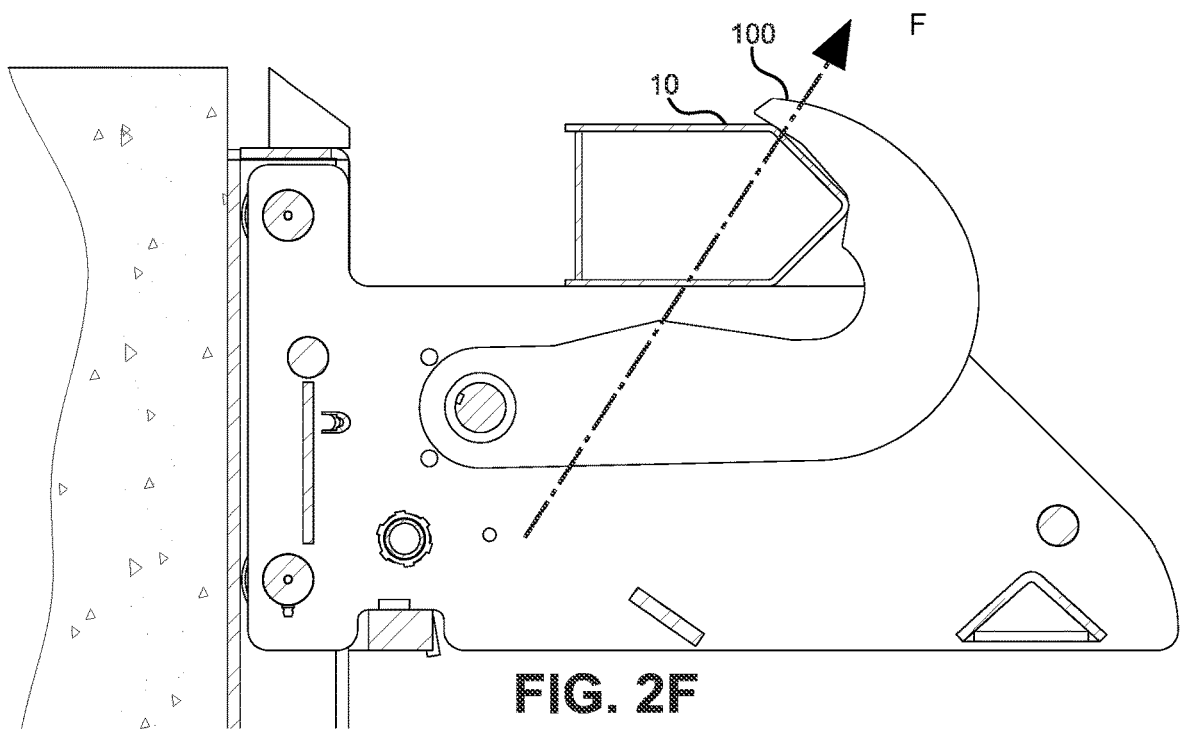

FIG. 1 shows an exemplary embodiment of a hook 100 according to the present invention for engaging with a RIG bar 10 of a trailer. Engagement of the RIG bar 10 with the hook 100 is shown in FIGS. 2a-2f. The RIG bar 10 may have a cross-section that is rectangular (FIGS. 2a, 2b), flanged rectangular (FIGS. 2c, 2d), and pentagonal (FIGS. 2e, 2f). These cross-sectional configurations of the RIG bar 10 are exemplary; use of the hook 100 with other configurations of RIG bars are contemplated. The hook 100 comprises a shank 110, a hook tip 160, and a hook bend 120 extending between the shank 110 and the hook tip 160. The hook bend 120 has an outer hook surface 101 and an inner hook surface 102 opposite to the outer hook surface 101, each of the outer hook surface 101 and the inner hook surface 102 extending between the shank 110 and the hook tip 160.

The shank 110 extends from an axle interface 111 to the hook bend 120. The axle interface 111 allows the hook 100 to be rotatably attached to a carriage 280 via an axle 288 (shown in FIG. 2a). The shank 110 also includes a shank offset 112 which is an upwardly angled surface of shank 110. The angle of the shank offset 112 may range from approximately 4 degrees to approximately 17 degrees from horizontal in the exemplary embodiment of FIG. 1. As a result, movement of the RIG bar 10 along the upper surface of the shank offset 112 causes the hook 100 to rotate slightly in a downwards direction. This also enable rotational-position detection of the hook 100 without requiring additional alterations to the cam surfaces CS (shown in FIG. 2a) of the system, as the cam surfaces CS will have the same rotational positioning during all deployments of the exemplary hook 100 as with previously manufactured hooks. This will allow the hook 100 to be retrofit into existing vehicle restraining systems without alteration to such systems.

The hook bend 120 includes a primary bend 130, a secondary bend 140, and an optional tertiary bend 150. The primary bend 130, secondary bend 140, and tertiary bend 150 extend in order along the inner hook surface 102 from the hook tip 160 to the end of the shank 110. The primary bend 130 is made up of two planar surfaces, where the primary bend 130 is the vertex of the two planar surfaces. The secondary bend 140 is also made up of two planar surfaces, where the secondary bend 140 is the vertex of the two planar surfaces. One of the planar surfaces of the primary bend 130 may overlap, be co-planar with, or be the same planar surface as one of the planar surfaces of the secondary bend 140. The tertiary bend 150 is made up of a curved surface having a radius smaller than that of the hook bend 120. An optional inner protrusion 151 may extend from the inner hook surface 102 between the secondary bend 140 and the tertiary bend 150. Each of the primary bend 130, secondary bend 140, and tertiary bend 150 is configured such that movement of the RIG bar 10 against the inner hook surface 102 causes the hook 100 to rotate upwardly.

As can be seen in FIGS. 2a-2f, reaction force lines or force vectors (denoted as dashed lines F in each figure) extend through each of the primary bend 130, secondary bend 140, and tertiary bend 150 depending upon the size and configuration of the RIG bar 10 and the bend interacted with. The hook 100 experiences a torque applied in the engaged direction because the orientation and interaction of the primary bend 130, secondary bend 140, or tertiary bend 150 and the RIG bar 10 results in each force vector F extending in front of and below the axle interface 111. As a result, the hook 100 is rotated in a counterclockwise direction from the perspective of the views of the embodiments shown in FIGS. 2a-2f.

The hook tip 160 preferably comprises a smooth tip proximate to the primary bend 130 of the inner hook surface 102. The hook tip 160 does not include any teeth, additional hooks, barbs, or other protrusions to prevent such structures from deforming and affecting the ability of the hook 100 to connect with the RIG bar 10.

Multiple dimensions of the hook 100 may vary. The radius from the hook tip 160 to the furthest point of the hook bend 120 may be up to 9 inches. The width of the hook bend 120 between the outer hook surface 101 and the tertiary bend 150 may vary from approximately 2.00 inches to approximately 2.61 inches when the tertiary bend 150 and inner protrusion 151 are present. The width of the hook bend 120 between the outer hook surface 101 and the secondary bend 140 may vary from approximately 1.89 inches to approximately 2.61 inches in embodiments lacking the tertiary bend 150 and inner protrusion 151. The distance between the center of the tertiary bend 150 and the tip of the protrusion 151 may vary between approximately 2.28 inches and approximately 0.53 inches.

Figure 3:
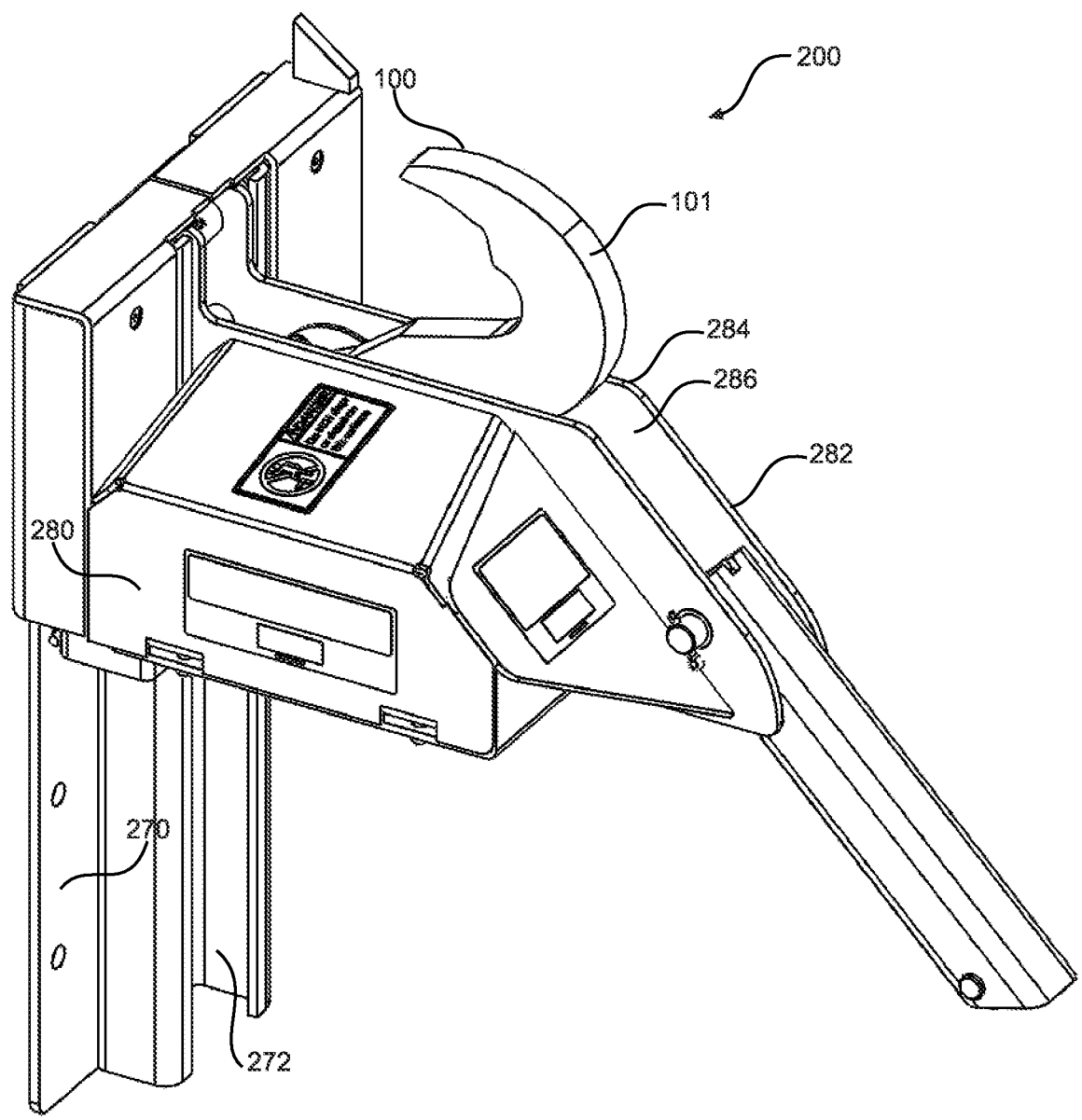
FIG. 3 is a perspective view of an exemplary embodiment of the vehicle restraining hook system.

An exemplary embodiment of a vehicle restraint system 200 is shown in FIG. 3. The system 200 preferably has at least one vertical member 270 with a track 272, the carriage 280 that rides along the track 272, and the hook 100 pivotably attached to the carriage 280 by means of the axle 288. The vertical member 270 is mountable to the face 14 of a loading dock 12, as shown in FIG. 2a.

The carriage 280 preferably has a plurality of carriage RIG riding surfaces preferably including a sloped portion 282 and a generally horizontal portion 284, and an elongated aperture 286 extending inward from the carriage RIG riding surfaces 282, 284 in which the hook 100 preferably resides when not in use and is pivotable outward therefrom when in use.

Additionally, or alternatively, the carriage 280 is biased upwards by a biasing mechanism (not shown), for example one or more springs.

Figure 4A:
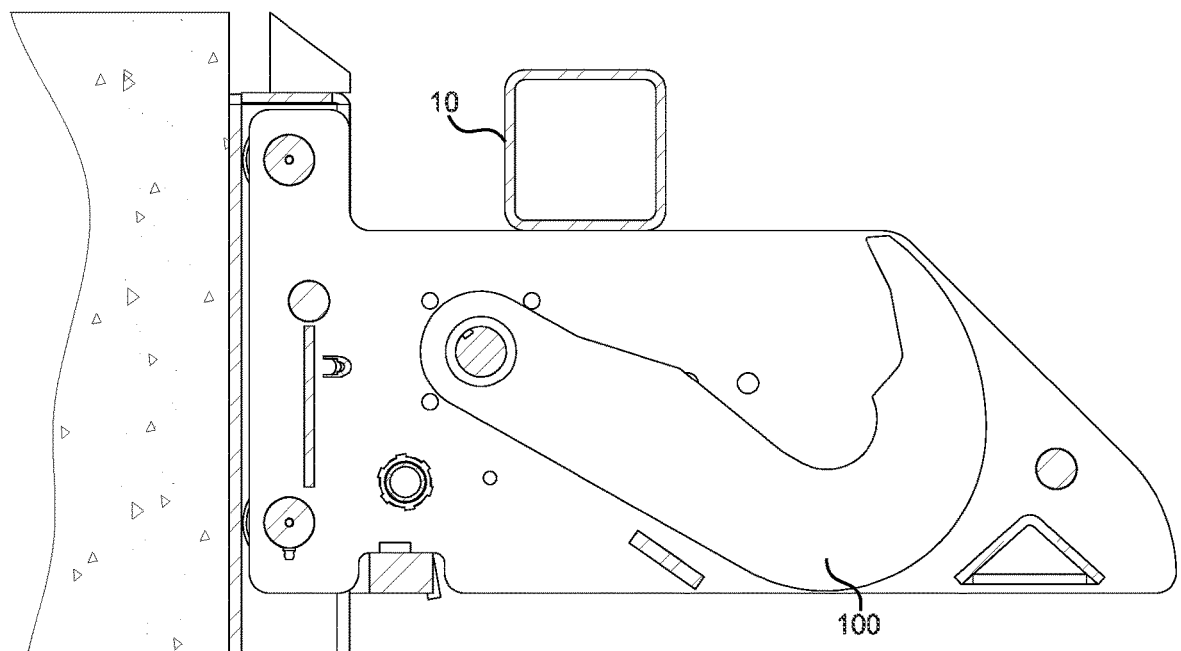
FIGS. 4a, 4b, 4c, and 4d are side views of an exemplary embodiment of the vehicle restraining hook system at various stages of use with a RIG bar.

Looking to FIGS. 4a through 4d, the system 200 is shown in use as it interacts with the RIG bar 10 of a trailer (not shown). As illustrated in FIG. 4a, the hook 100 is in a first stored position within the elongated aperture 286. As a trailer (not shown) approaches the loading dock 12, the RIG bar 10 engages the carriage 280 at the sloped portion carriage RIG riding surface portion 282 and pushes the carriage 280 into position by continuing to back up the trailer. The RIG bar 10 slides along the carriage RIG riding surfaces 282, 284 until the RIG bar 10 is in beyond the point 130 of the hook 100 and the trailer is parked firmly against dock bumpers (not shown).

Figure 4B:
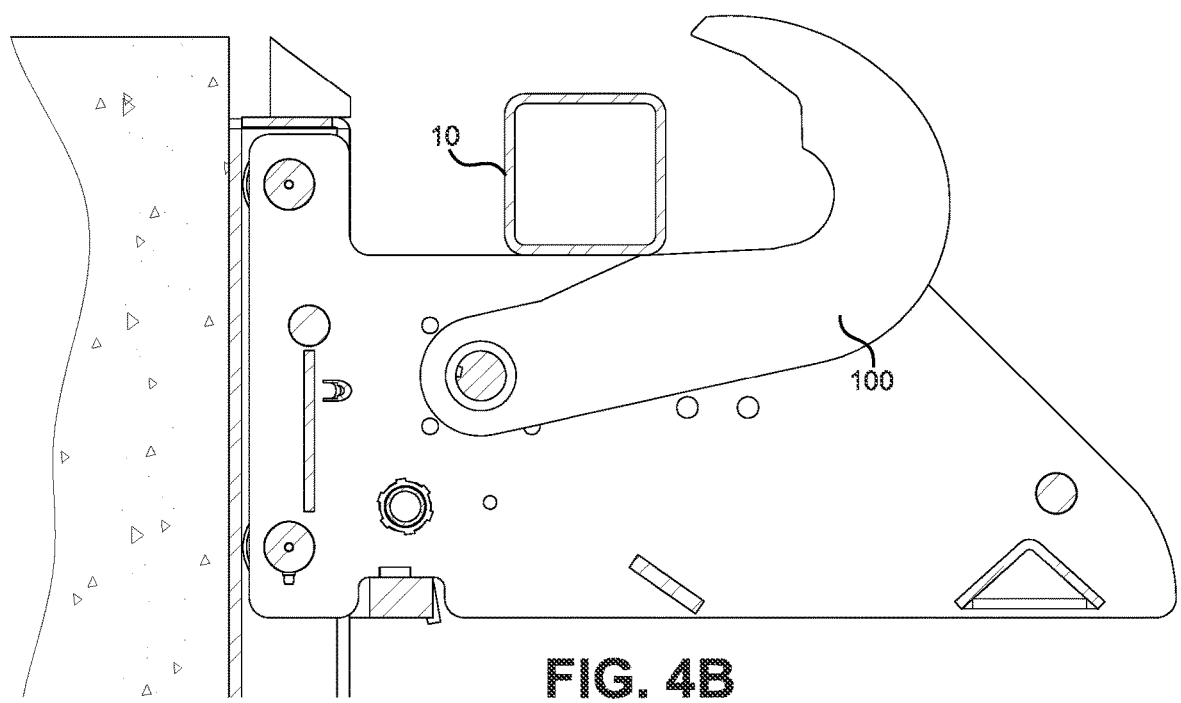

An operator then activates the hook 100 by an electromechanical means or any other means known in the art to rotate the hook 100 upwardly out of the elongated aperture 286 to a second engaging position, as shown in FIG. 4b. At this point, once the hook 100 is rotated upwardly, the horizontal motion of the RIG bar 10 towards the inner hook surface 102 and away from the face 14 of the loading dock 12 will rotate the hook 100 slightly downwards because of the contact of the RIG bar 10 with the shank offset 112.

Figure 4C:
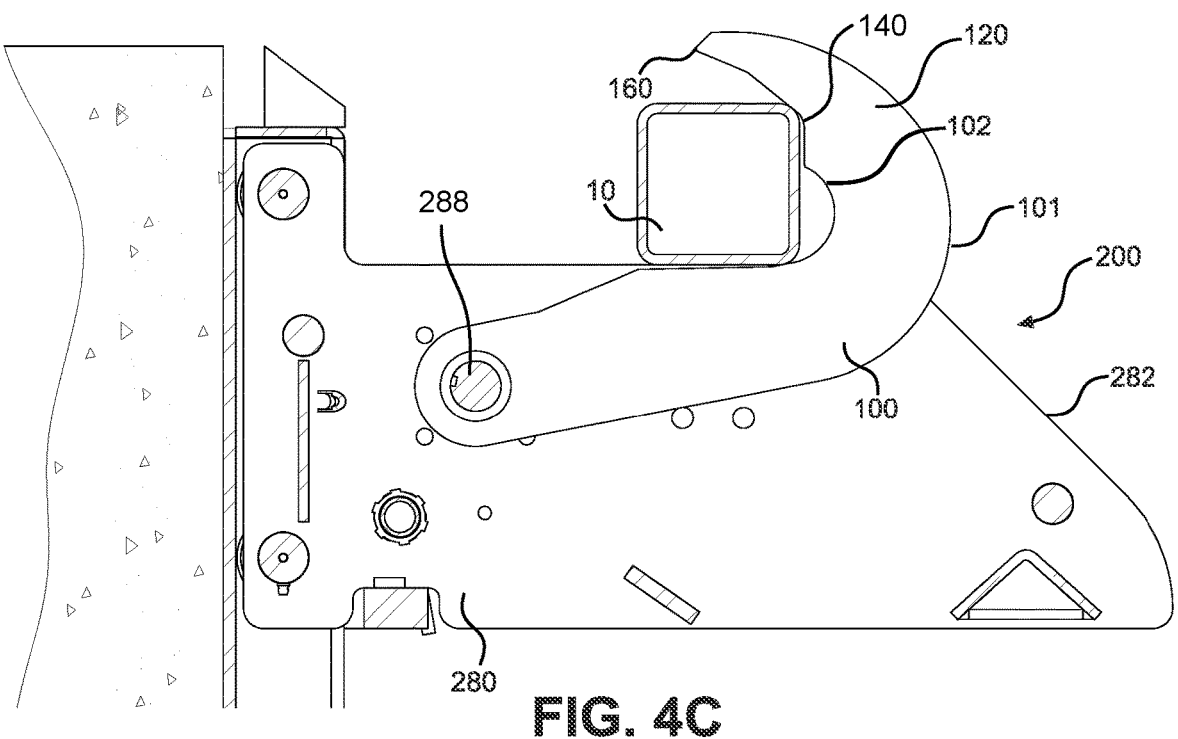

A third engaged position occurs when the RIG bar 10 moves beyond the shank offset 112 and into contact with the inner hook surface 102 of the hook bend 120 as shown in FIG. 4c. Further movement of the RIG bar 10 away from the face 14 of the loading dock 12 will rotate the hook 100 upwards due to contact between the RIG bar 10 and at least one of the primary bend 130, the secondary bend 140, and/or the tertiary bend 150. The system 200 is shown in FIG. 4c with the hook 100 in the engaged position with the RIG bar 10 in contact with the inner hook surface 102 of the hook bend 120. Any resultant force from the contact between the RIG bar 10 and the hook 100 acts normal to the inner hook surface 102 as indicated by the force vector F.

The force vector F extends from the point of contact and below the axle interface 111 around which the hook 100 rotates, and thereby provides a resultant torque on the hook 100 in the engaging position direction. As oriented in FIGS. 1 through 4d, the direction of rotation is a counterclockwise rotation. The orientation of the force vector F below the axle interface 111 provided by the configuration of the inner hook surface 102 and reaction with the RIG bar 10, encourages a torque to be applied to the hook 100 in the engaging position direction when horizontal motion of the RIG bar 10 away from the face 14 of the loading dock 12 is experienced. The resultant torque on the hook 100 encourages the maintenance of the rotational position. At this point the RIG bar 10 cannot move further away from the face 14 of the loading dock 12 and is fully captured by the hook 100.

Figure 4D:
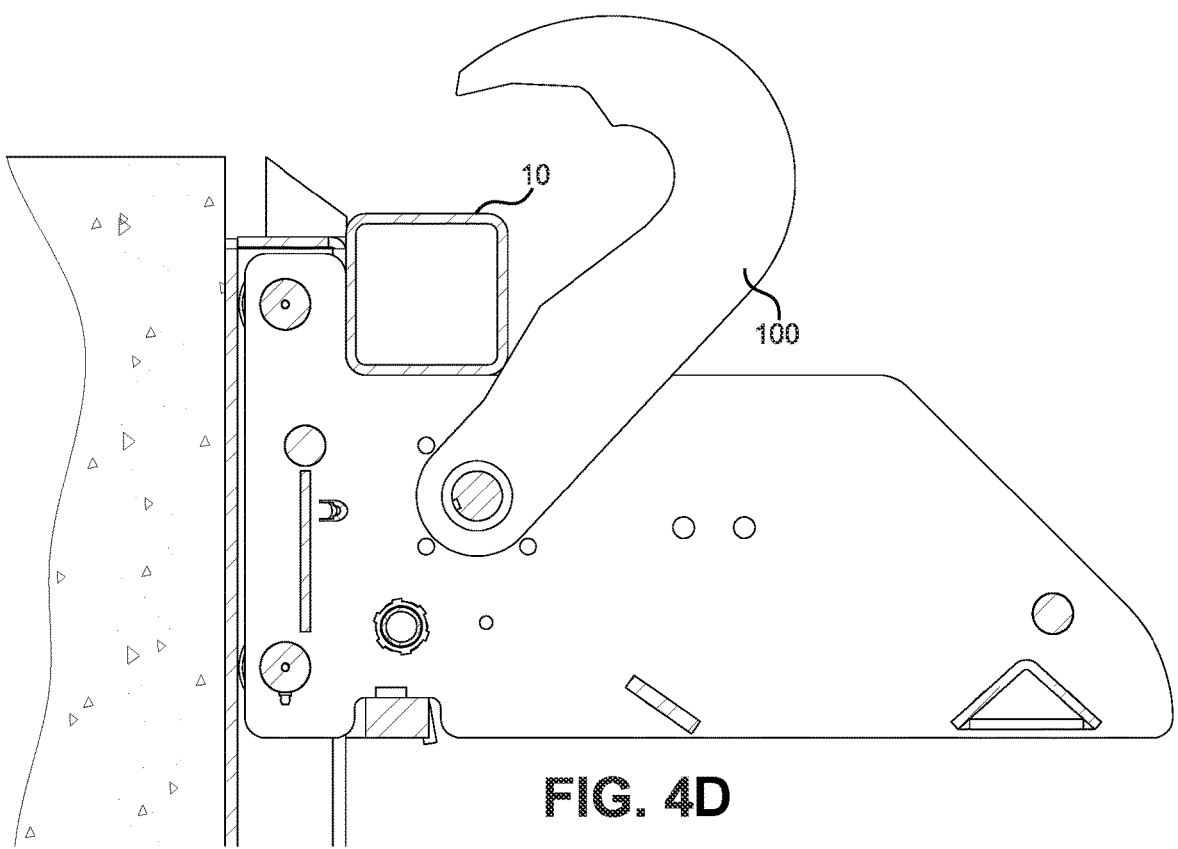

A fourth extended position occurs when the RIG bar 10 moves back toward the loading dock 12 as shown in FIG. 4d. Movement of the RIG bar 10 toward the face 14 of the loading dock 12 will rotate the hook 100 upwards due to the electro-mechanical means or any other means previously used to rotate the hook 100 upwardly. Interaction between the RIG bar 10 and the shank 110 will prevent over-rotation of the hook 100.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and/or method steps described herein may be used alone or in combination with other configurations, systems and/or method steps. It is to be expected that various equivalents, alternatives and/or modifications are possible within the scope of the appended claims.

What is claimed is:

1. A vehicle restraining hook device, comprising:
a shank extending between an axle interface and a hook bend;
the hook bend comprising an inner hook surface extending between the shank and a hook tip;
the inner hook surface comprising at least a primary bend and a secondary bend;
the primary bend comprising two planar surfaces connected at an obtuse angle;
the secondary bend comprising two planar surfaces connected at an obtuse angle; and
the hook tip comprising a smooth tip, wherein the hook tip is the only structure between an outer hook surface and the primary bend, such that the area between the outer hook surface and the primary bend does not include any additional teeth, hooks, barbs, or protrusions.

2. The device of claim 1, wherein the hook tip is located adjacent to the primary bend.

3. The device of claim 1, wherein the shank further comprises a shank offset on an upper surface of the shank.

4. A vehicle restraining hook device, comprising:
a shank extending between an axle interface and a hook bend;
the hook bend comprising an inner hook surface extending between the shank and a hook tip;
the inner hook surface comprising a primary bend, a secondary bend, and a tertiary bend;
the primary bend comprising two planar surfaces connected at an obtuse angle;
the secondary bend comprising two planar surfaces connected at an obtuse angle;
the tertiary bend comprising a curved surface; and
the hook tip comprising a smooth tip proximate to the primary bend, wherein the hook tip is the only structure between an outer hook surface and the primary bend, such that the area between the outer hook surface and the primary bend does not include any additional teeth, hooks, barbs, or protrusions.

5. The device of claim 4, wherein the tertiary bend extends between the secondary bend and the shank.

6. The device of claim 5, further comprising an inner protrusion located between the secondary bend and the tertiary bend and extending from the inner hook surface.

7. The device of claim 5, wherein the curved surface of the tertiary bend has a radius smaller than that of the hook bend.

8. The device of claim 4, wherein the hook tip is located adjacent to the primary bend.

9. The device of claim 4, wherein the shank further comprises a shank offset on an upper surface of the shank.

10. A vehicle restraining hook system, comprising:
a vertical member with a track;
a carriage with a horizontal carriage RIG riding surface and an elongated aperture, the carriage slidably engaged with the track of the vertical member; and
a hook, comprising:
a shank extending between an axle interface and a hook bend,
the hook bend comprising an inner hook surface extending between the shank and a hook tip,
the inner hook surface comprising at least a primary bend and a secondary bend, the primary bend comprising two planar surfaces connected at an obtuse angle, the secondary bend comprising two planar surfaces connected at an obtuse angle, and
the hook tip comprising a smooth tip, wherein the hook tip is the only structure between an outer hook surface and the primary bend, such that the area between the outer hook surface and the primary bend does not include any additional teeth, hooks, barbs, or protrusions,
wherein the hook is rotatable relative to the carriage about the axle interface in an engaging direction and a disengaging direction,
the inner hook surface configured to make contact with a RIG bar at a point of contact on at least one planar surface of the primary bend or the secondary bend such that when the RIG bar is in contact with said point of contact a resultant force is generated normal to the inner hook surface, wherein the resultant force defines a force vector which extends from the point of contact and below the axle interface, whereby the orientation of the resultant force creates a resultant torque about the axle interface in the engaging direction.

11. The system of claim 10, wherein the resultant torque rotates the hook in an upwards direction.

12. The system of claim 10, wherein the RIG bar has a rectangular cross-section.

13. The system of claim 10, wherein the RIG bar has an irregular pentagonal cross-section.

\* \* \* \* \*

UNITED STATES PATENT AND TRADEMARK OFFICE
CERTIFICATE OF CORRECTION

| | | |
|---|---|---|
| PATENT NO. | : 11,254,526 B1 | |
| APPLICATION NO. | : 17/146078 | |
| DATED | : February 22, 2022 | |
| INVENTOR(S) | : Michael Meichtry | |

It is certified that error appears in the above-identified patent and that said Letters Patent is hereby corrected as shown below:

On the Title Page

Item (73) should read:
(73) Assignee: Multi-Fab Products, LLC
Menomonee Falls, WI (US)

Signed and Sealed this
Fifth Day of September, 2023

Katherine Kelly Vidal
*Director of the United States Patent and Trademark Office*